United States Patent
Lee et al.

(10) Patent No.: US 6,427,577 B1
(45) Date of Patent: Aug. 6, 2002

(54) LOAD BEARING APPARATUS FOR USE WITH FLUID POWER SYSTEMS

(75) Inventors: James J. Lee; Steven M. Byle; John C. Montague, all of Houston, TX (US)

(73) Assignee: Novellant Technologies, LLC, Houston, TX (US)

( * ) Notice: Subject to any disclaimer, the term of this patent is extended or adjusted under 35 U.S.C. 154(b) by 0 days.

(21) Appl. No.: 09/309,084

(22) Filed: May 10, 1999

Related U.S. Application Data

(60) Provisional application No. 60/111,705, filed on Dec. 10, 1998.

(51) Int. Cl.[7] ............................................. F01B 19/00
(52) U.S. Cl. ............................................. 92/52; 92/93
(58) Field of Search ............................ 92/35, 51, 52, 92/53, 90, 93, 105

(56) References Cited

U.S. PATENT DOCUMENTS

| | | | | |
|---|---|---|---|---|
| 1,885,457 A | * | 11/1932 | Lord et al. ..................... | 92/99 |
| 2,126,707 A | * | 8/1938 | Schmidt ................... | 267/140.5 |
| 2,220,581 A | * | 11/1940 | Piron ......................... | 267/35 |
| 2,546,956 A | * | 3/1951 | Yeomans ................... | 92/53 X |
| 2,664,673 A | * | 1/1954 | Devorss, Jr. ............... | 92/105 X |
| 2,897,650 A | * | 8/1959 | Carlson, Jr. et al. ........ | 92/51 X |
| 3,880,053 A | * | 4/1975 | Trechsel et al. .......... | 92/105 X |
| 4,555,098 A | | 11/1985 | Shtarkman | |
| 4,560,150 A | | 12/1985 | Shtarkman | |
| 4,577,842 A | | 3/1986 | Shtarkman | |
| 4,832,317 A | | 5/1989 | Alaphilippe | |
| 4,930,336 A | | 6/1990 | Smedberg et al. | |
| 5,253,850 A | | 10/1993 | Burkley et al. | |
| 5,267,725 A | | 12/1993 | Wode et al. | |
| 5,489,009 A | | 2/1996 | Kawamata et al. | |

FOREIGN PATENT DOCUMENTS

| | | | | |
|---|---|---|---|---|
| DE | | 1180621 | * 10/1964 | ..................... 92/90 |

* cited by examiner

Primary Examiner—John E. Ryznic
(74) Attorney, Agent, or Firm—Rosenthal & Osha, L.L.P.

(57) ABSTRACT

A load bearing apparatus includes a first container having enclosed ends and at least one expansion segment. The expansion segment includes a first cylinder and a second cylinder of diameter smaller than the first cylinder disposed along a longitudinal axis of the first cylinder. An elastomer seal is connected between the first and second cylinders to form a fluid tight seal between the cylinders. The elastomer seal further permits translation of the first cylinder with respect to the second cylinder in a direction along the longitudinal axis of the first cylinder.

19 Claims, 12 Drawing Sheets

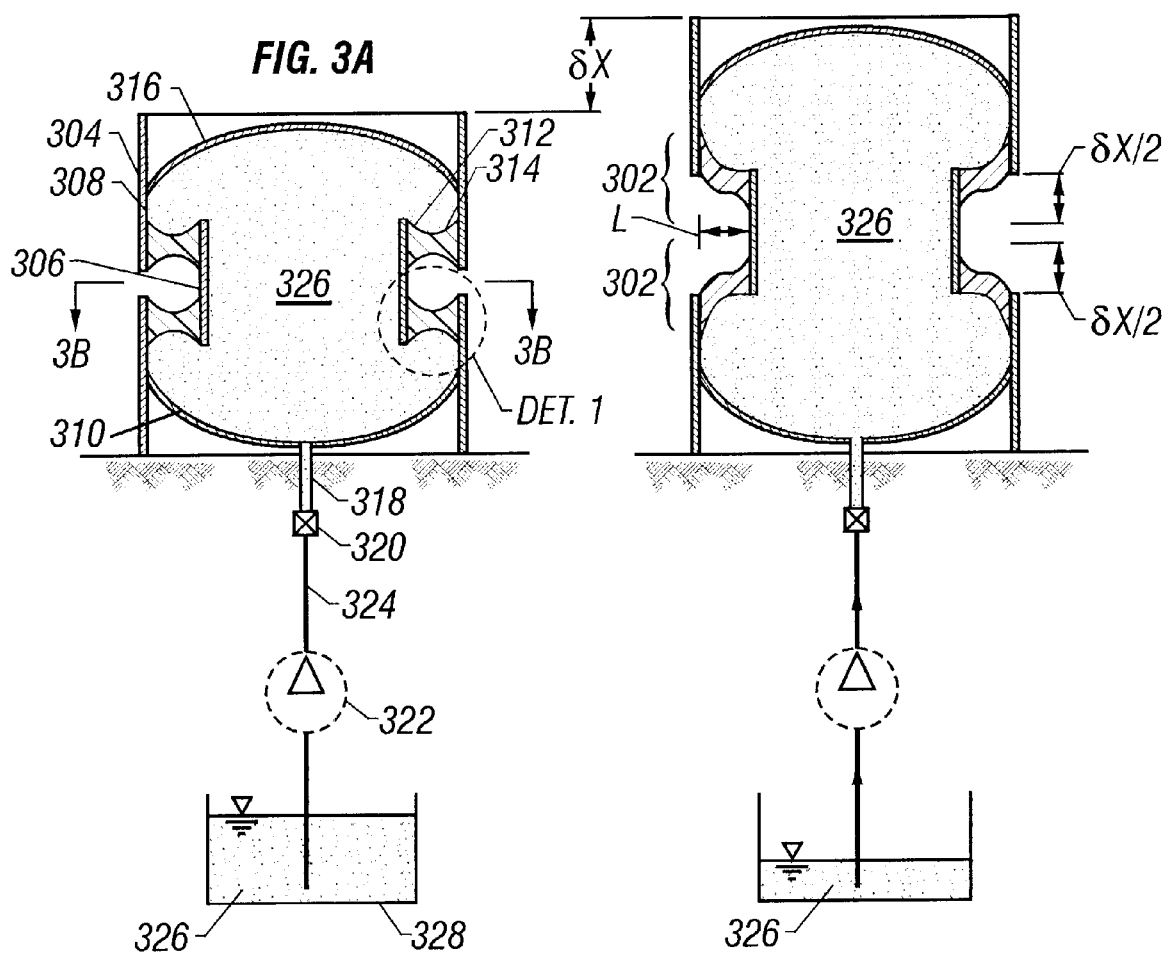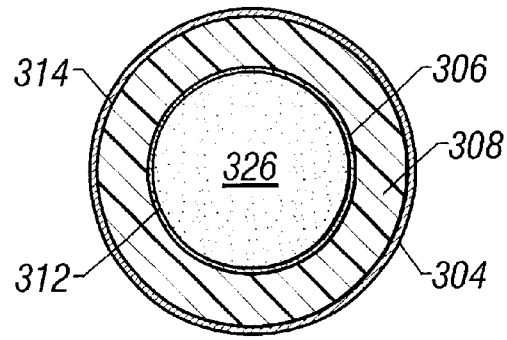

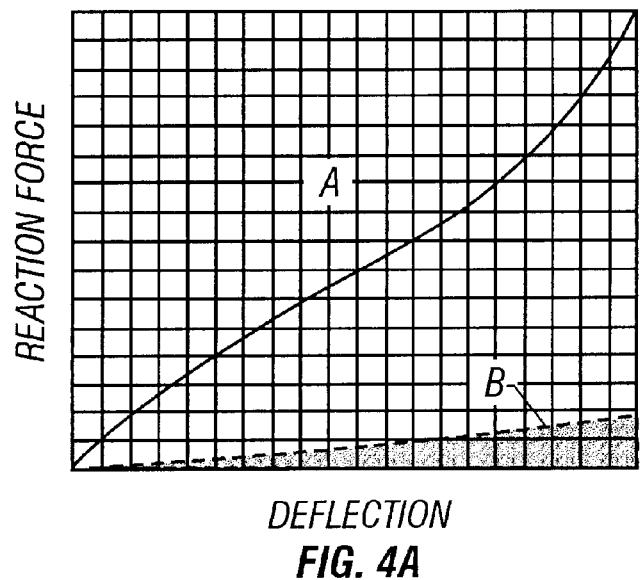
FIG. 4A
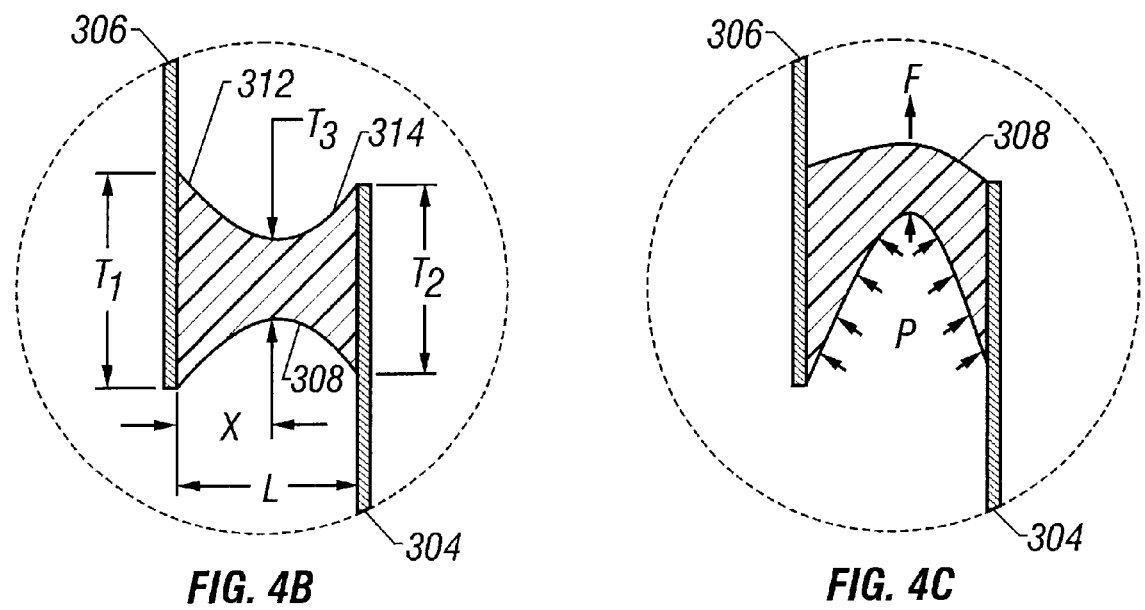
FIG. 4B  FIG. 4C

FIG. 9A
FIG. 9B
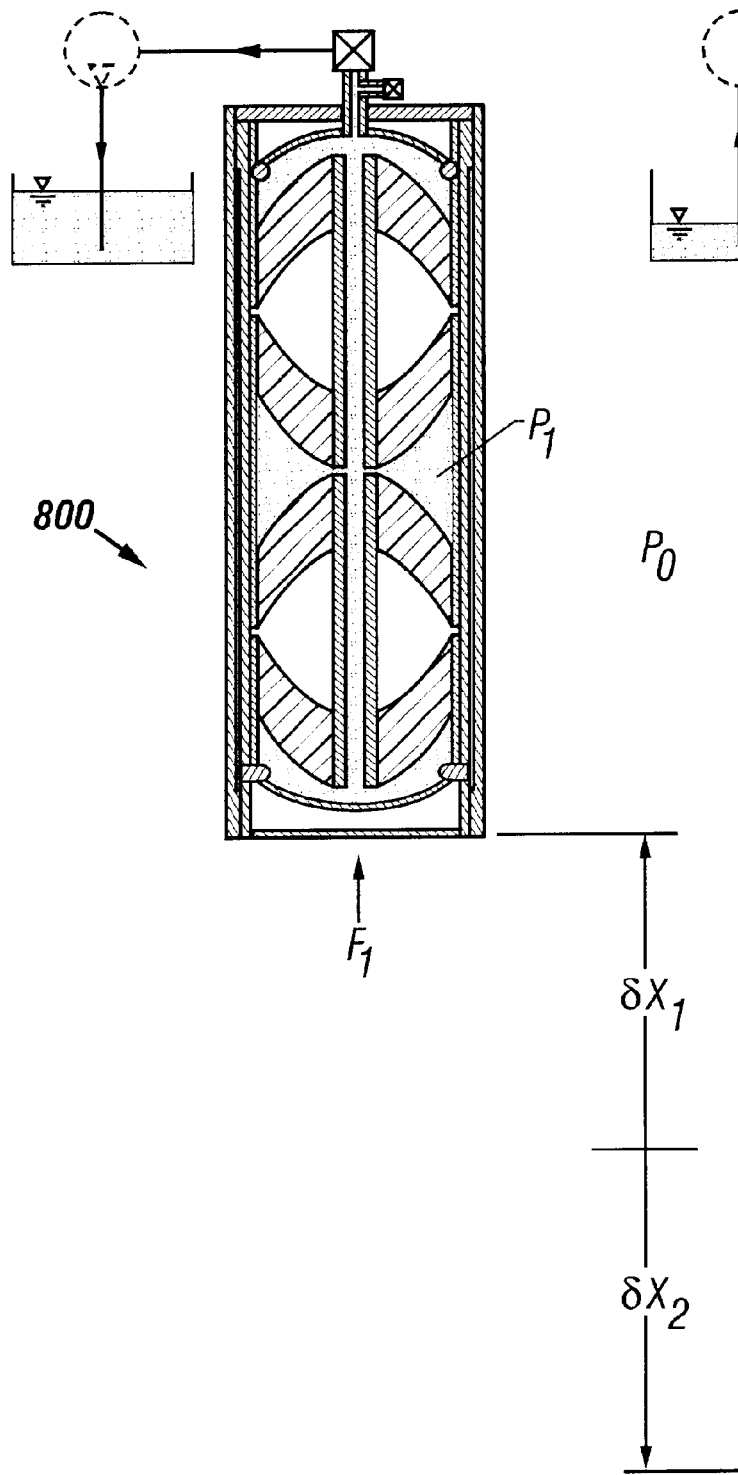
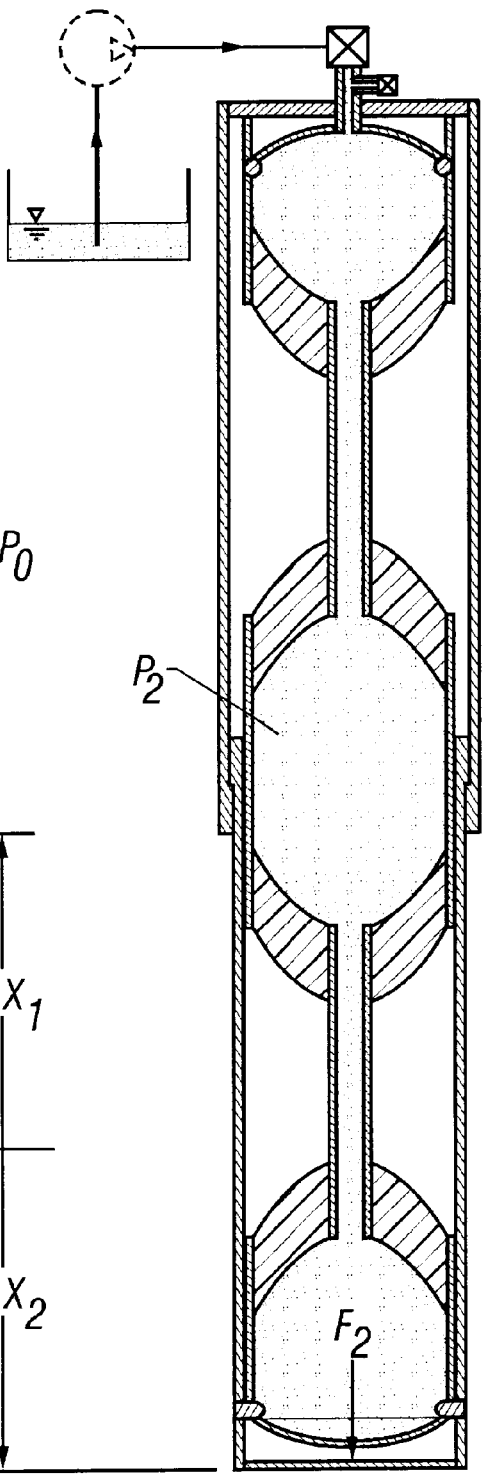

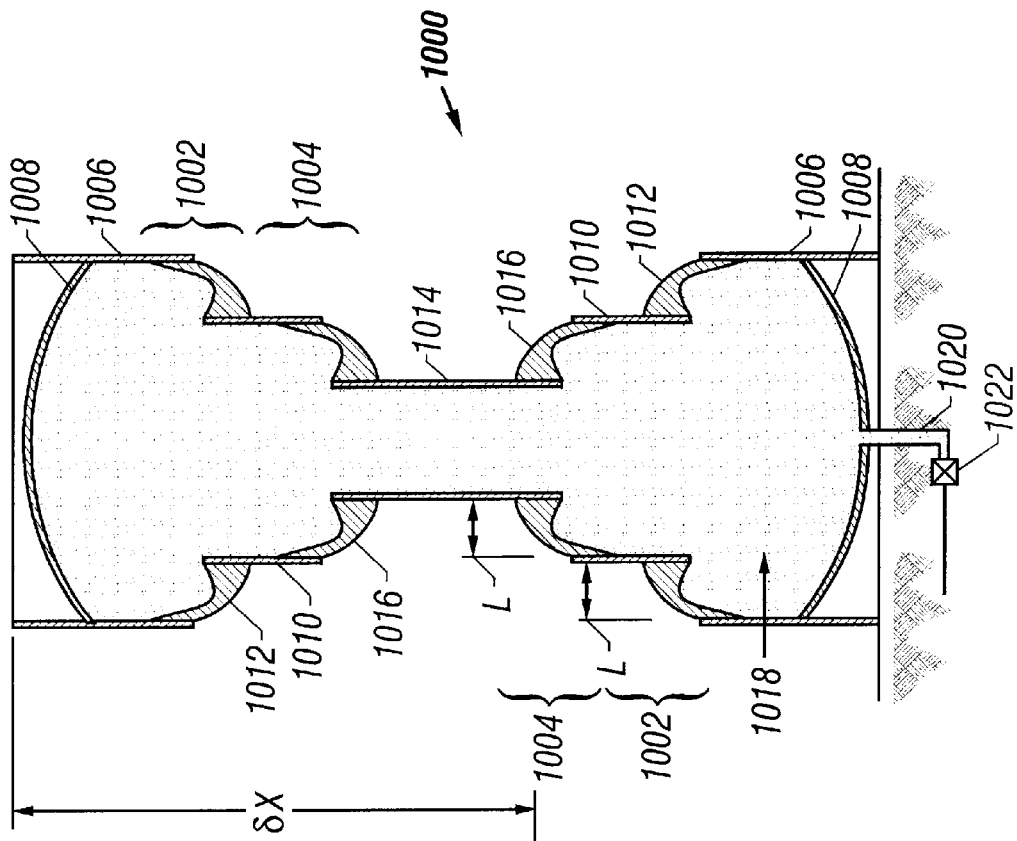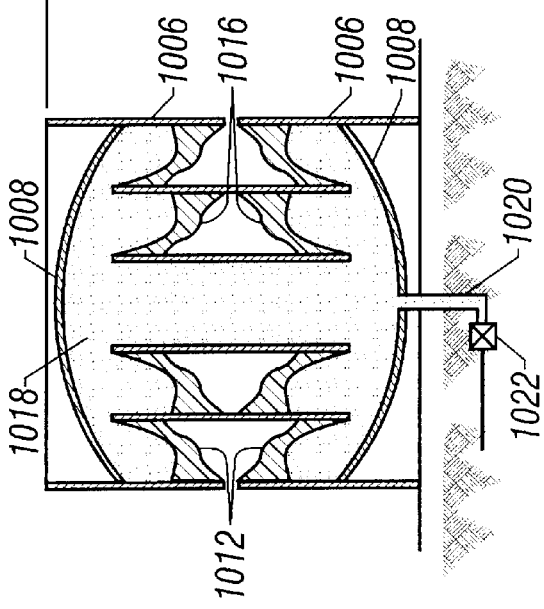

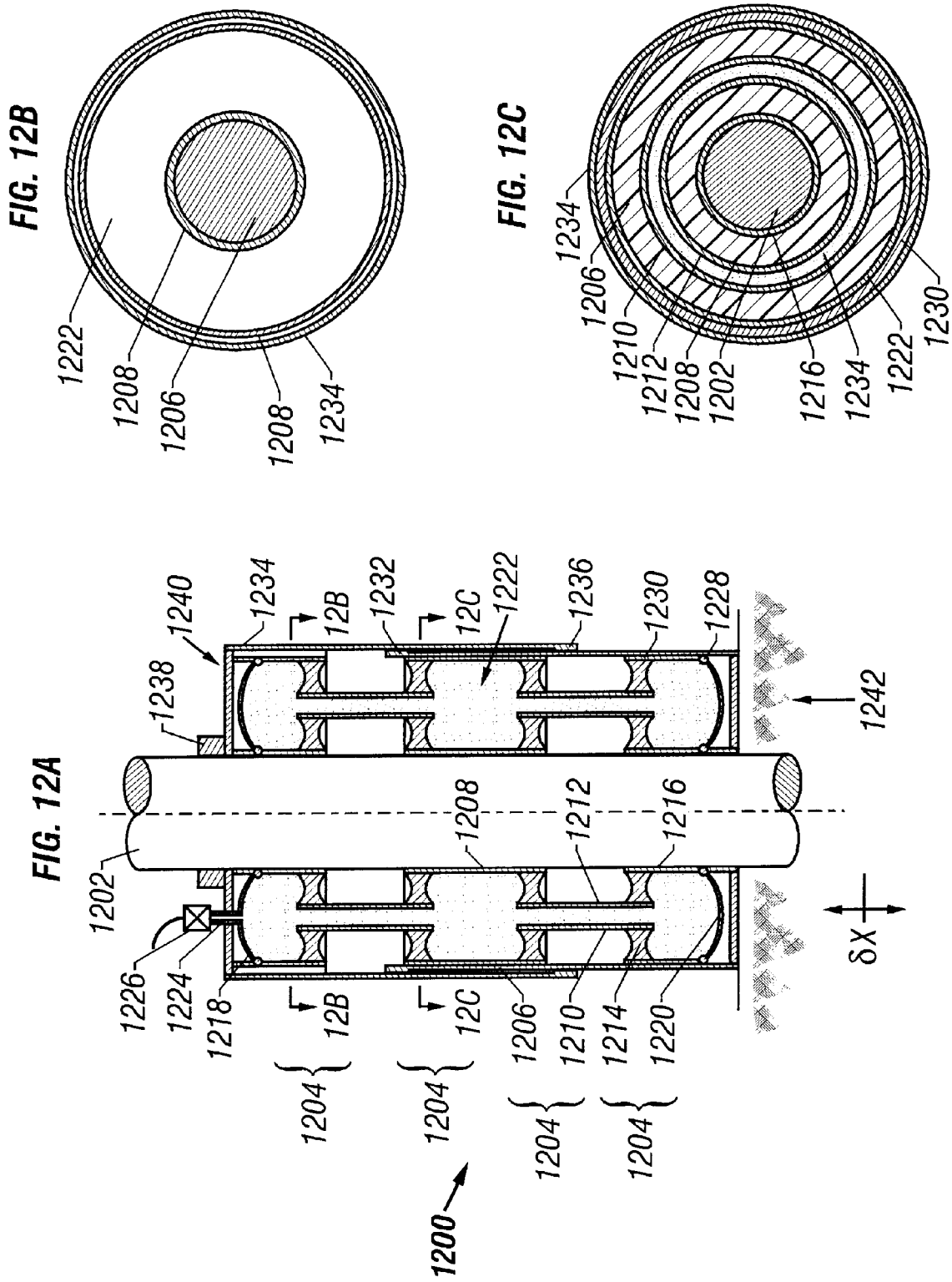

LOAD BEARING APPARATUS FOR USE WITH FLUID POWER SYSTEMS

CROSS-REFERENCE TO RELATED APPLICATIONS

This application claims priority from U.S. Provisional Application No. 60/111,705, filed Dec. 10, 1998.

BACKGROUND

The invention relates generally to fluid power systems. More particularly, the invention relates to a fluid power system which employs hydraulic pressure to provide load bearing force and extension control.

Fluid power systems are employed in a wide variety of small-scale and large-scale industrial applications. For example, fluid power systems are used to generate large compressive forces in plastic molding, multiply input force in braking systems, adjust elevation in jacks, lift weight in cranes, and provide control actuators in steering systems. In the offshore oil industry, hydraulic systems are employed in applications such as subsea template leveling, riser tensioning, and equipment jacking. Many of these applications require long-term service, exposure to corrosive environments, or even immersion in seawater.

Fluid power systems typically employ hydraulic cylinders to provide load bearing force and elevation control. As illustrated in FIG. 1A, a hydraulic cylinder 100 conventionally comprise a piston 102 and piston rod 104 disposed within a cylinder 106. A sliding O-ring seal 110 and a rod wiper 112 are typically positioned about an aperture 114 in the cylinder 106. The sliding seal 110 and wiper 112 act to seal fluid in the cavity 116 of the cylinder 106 while permitting extension and retraction of piston rod 104 with respect to cylinder 106. In operation, the piston 102 also comprises one or more sliding seals forming to isolate fluid pressure on either side of the piston 102. Fluid 118 is generally drawn from a reservoir 120 through a pump 122. A control assembly 124 directs fluid flow. As illustrated by reference to FIGS. 1B–C, differential pressure ($P_1 > P_2$) provided by the pump 122 acts on the surface areas of the piston 102 to induce a force which extends ($F_1$) or retracts ($F_2$) the piston rod 104. The magnitude of extension or retraction force is generally described by the relationship of $F=PA$, where: (F) is the extension or retraction force, (P) is the differential pressure ($P_1-P_2$) and (A) is the surface area of the piston upon which the pressurized fluid acts.

Conventional hydraulics are widely employed. Several aspects of conventional hydraulic cylinders, however, inherently limit their application. The first limiting factor is the difficulty in forming a seal which can contain the high-pressure fluid within the hydraulic cylinder while simultaneously permitting relative movement of the cylinders. Sliding seals are prone to leakage, wear, and failure under high pressure and generally require periodic monitoring and replacement. A second limiting factor relates to the size of the hydraulic cylinder. The maximum size of the seal is generally limited due to difficulties in the manufacturing process. This limited seal size results in smaller-diameter hydraulic cylinders which require higher working fluid pressures to generate loads.

In addition to the two limiting factors mentioned above, conventional hydraulic cylinders require strict tolerances on cylinder machining and O-ring fabrication. The fluid employed in hydraulic cylinders is generally an oil derivative. This type of fluid is selected to prevent the leakage or seal corrosion that can occur with other fluids such as seawater or fresh water. The hydraulic fluid can, however, be an environmental contaminant and can be expensive where large quantities are required.

It is, therefore, desirable to provide a fluid power system which does not employ sliding seals or moving parts. It is further desirable to provide a seal with less strict manufacturing tolerances, reduced maintenance, and lower failure rates. It is also desirable to provide a system that can employ inexpensive and environmentally friendly fluids, such as fresh or seawater. It is still further desirable to have a system that can be fabricated in large diameters to provide large extension forces with relatively lower working fluid pressures.

The principle of nested cylinders having relative displacements is employed in other technical fields, such as bonded rubber shear springs. The offshore oil industry employs bonded rubber shears springs for use as marine shock cells in various applications. The general function of a marine shock cell is to absorb impact loads, such as those induced during the docking operations of a ship to an offshore oil structure. As illustrated in FIGS. 2A–B, a conventional marine shock cell 200 comprises an inner cylinder 202 and a larger diameter outer cylinder 204. An elastomer annulus 206 spans the gap between the inner 202 and outer 204 cylinders. The elastomer annulus 206 is bonded to the outer surface 208 of the inner cylinder 202 and the inner surface 210 of the outer cylinder 204 during the molding process. The application of a force (F) to the shock cell 200 induces deflection ($\delta X$). A designer arranges such variables as cylinder diameter (D), gap length (L), thickness of the elastomer annulus (T), and elastomer mixture in order to produce a desirable reaction force versus deflection characteristic for the shock cell 200. A generalized reaction force versus deflection characteristic for a shock cell is illustrated in FIG. 2C. Generally, the elastomer annulus 206 of the shock cell 200 resists deflection with an increasing force (F) as deflection ($\delta X$) increases. The area under the curve (A) corresponds to the quantity of impulse energy, or shock, absorbed by the shock cell through full deflection. Upon removal of the external force (F), the shock cell will return to an undeflected condition.

A shock cell provides elongation without the use of a sliding seal. Manufacturing tolerances are generally low. Marine shock cells function for decades without maintenance or failure. Shock cells can be manufactured in extremely large diameters. The function of a shock cell or other shear spring, however, is generally the inverse of the function of a fluid power system. A shock cell is a reactive device absorbing external energy input. A fluid power system actuates external energy input to provide power output. The elastomer annulus of a shock cell is designed to impede relative movement between cylinders and is not optimized to form a fluid tight seal. The sliding seal of a fluid power system is designed to enable relative movement between piston rod and cylinder.

SUMMARY

In general, in one aspect, the invention relates to a load bearing device which comprises an extendable, close-ended container having a first cylinder and a second cylinder, the first cylinder coaxially disposed about the second cylinder and having a diameter which is larger than a diameter of the second cylinder. A first elastomer annulus having an outer circumference bonded to an inner surface of the first cylinder, and an inner circumference bonded to an outer surface of the second cylinder, and first means for pumping a first fluid into and out of the container, wherein the bonds between the elastomer annulus and the first and second cylinders form fluid-tight seal for the container.

In general, in another aspect, the invention relates to a load bearing device which comprises at least one expansion segment comprising a first cylinder coaxially disposed about a smaller diameter second cylinder. An elastomer annulus has an inner circumference bonded to an outer surface of the second cylinder and an outer circumference bonded to an inner surface of the first cylinder. End caps enclosing a cavity is formed by the first and second cylinders and the elastomer annulus, and pumping means is included for adjusting a volume of fluid in the cavity, wherein changes in the fluid volume in the cavity induce relative displacements between the first and second cylinders.

In general, in another aspect, the invention relates to a method of bearing a load. The method comprises providing an extendable, close-ended container having a first cylinder and a second cylinder, the first cylinder coaxially disposed about the second cylinder and having a diameter which is larger than a diameter of the second cylinder, the first and second cylinder connected together by an elastomer annulus so as to form a fluid-tight seal between the elastomer annulus and the first and second cylinders, and inducing relative movement between the first and second cylinder by adjusting a volume of fluid within the container.

Other aspects and advantages of the invention will be apparent from the following description and the appended claims.

BRIEF DESCRIPTION OF THE DRAWINGS

FIGS. 3A–C illustrate cross-sectional views of an expandable cylinder unit in a mean and extended position.

FIGS. 4A–C show details of the elastomer seal and a comparative force versus deflection characteristic for the expandable cylinder unit of FIGS. 3A–C.

FIGS. 9A–B show the expandable cylinder unit of FIG. 8 in a fully retracted and fully extended condition.

FIGS. 10A–B illustrate cross-sectional views of an expandable cylinder unit having nested expansion segments.

FIGS. 12A–C illustrate cross-sectional views of an expandable cylinder unit forming a sleeve around a tubular member.

DETAILED DESCRIPTION

Figure 1B:
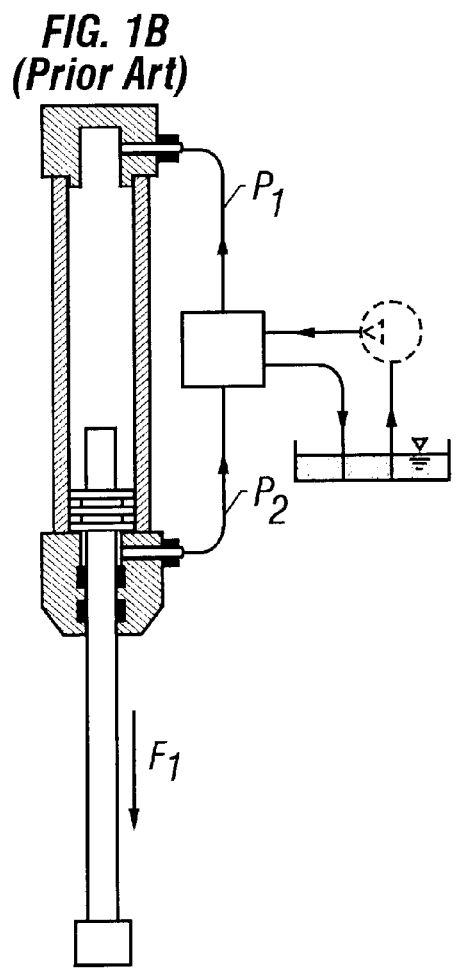
FIGS. 1A–C illustrate cross-sectional views of a prior art hydraulic cylinder unit in various conditions of extension and retraction.
Figure 1A:
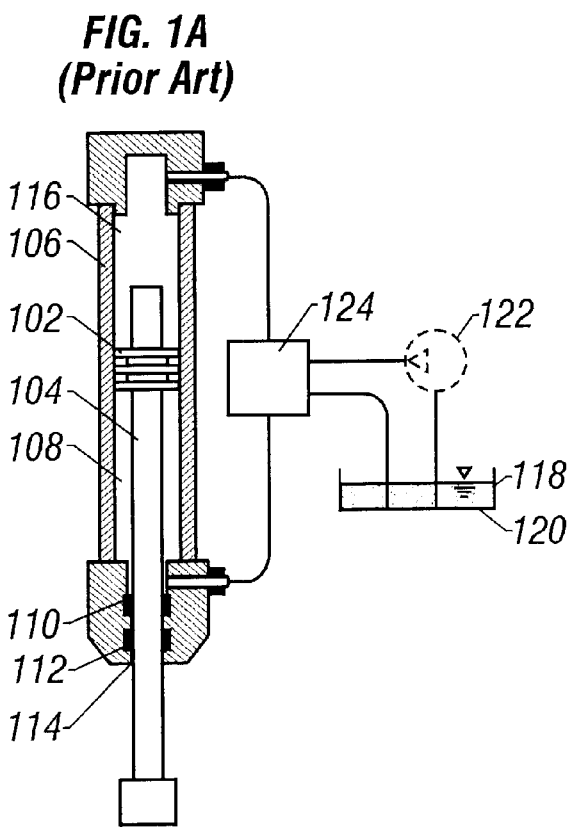
Figure 1C:
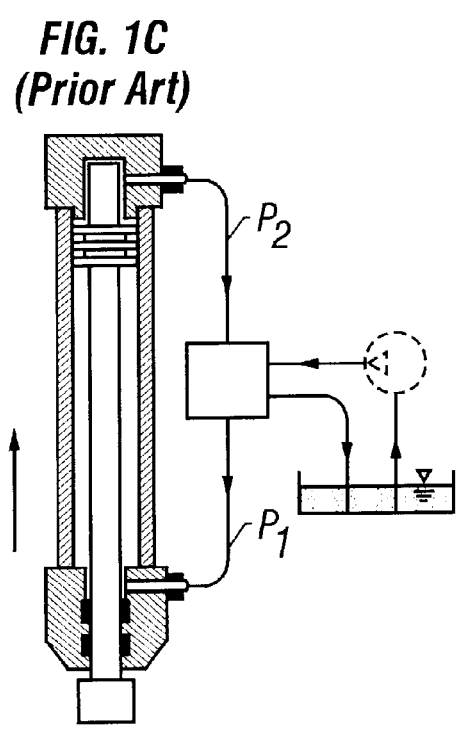

The following embodiments are descriptive only and are not to be considered limiting in any respect. Referring to the drawings wherein like characters are used for like parts throughout the several views, FIG. 3A depicts a load bearing expandable cylinder unit 300 comprising two expansion segments 302. Each expansion segment comprises an outer cylinder 304, an inner cylinder 306, and an elastomer seal 308. The outer cylinder 304 and the inner cylinder 306 may be made of rolled carbon steel pipe, forged steel ring, or other suitable material that is sturdy enough to withstand fluid pressure. The inner cylinder 306 has a narrower diameter than the outer cylinder 304 and is disposed within the outer cylinder 304 such that a cavity 310 is formed between the cylinders 302 and 304. The elastomer seal 308 is arranged in the gap formed between the outer cylinder 304 and the inner cylinder 306 and seals the cavity 310. The elastomer seal 308 includes an inner bond surface 312 and an outer bond surface 314. The bond surfaces 312 and 314 are bonded to the cylinders 302 and 306. End caps 316 enclose the ends of the cavity 310. Although the end caps 316 are shown as convex ellipses in cross-section, it should be clear that the end caps 316 can take on other shapes, e.g., concave, flat, circular. A fluid line 318 through an end cap 316 provides a means of fluid flow to and from the cavity 310. The fluid line 318 is connected through a valve 320 to a pump assembly 322 by a flexible hydraulic line 324. The pump assembly draws fluid 326 from and returns fluid 326 to a reservoir 328. Extension and retraction of the expandable cylinder unit 300 is induced by volumetric control of the fluid 326 within the cavity 310. In one embodiment, the active fluid 326 is water. As illustrated in FIG. 3B, when water 326 is injected by the pump 322 into the cavity 310, the expandable cylinder unit 300 elongates ($\delta X$) by deflection of the elastomer seals 308. In general, each seal deflects by a roughly equal fractional amount ($\delta X$/number of expansion joints 302) of the total elongation ($\delta X$). The Elastomers are generally capable of large elongation. A designer may, however, desire to limit the extent of deflection for various reasons such as bond and seal fatigue. In one embodiment, the deflection of an individual elastomer seal 308 from the mean position is held to a 1:1 ratio of the elastomer seal span length (L) such that ($\delta X/2=L$).

Figure 2A:
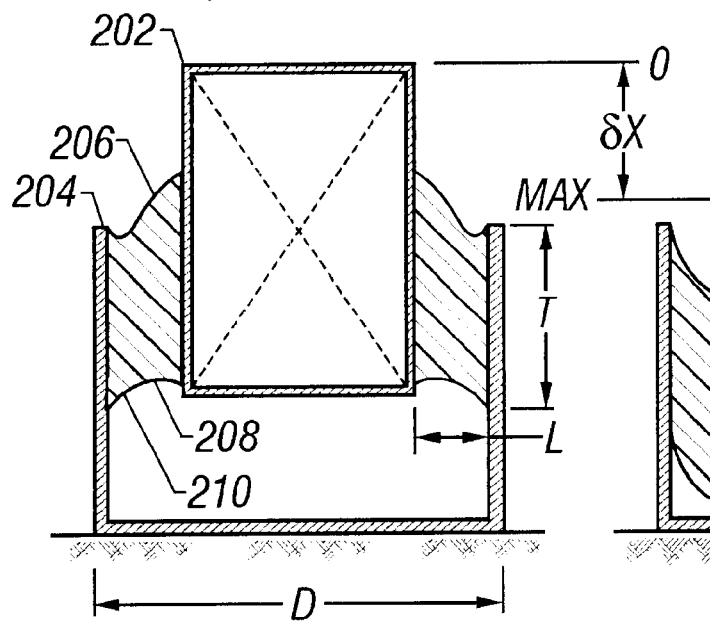
FIGS. 2A–C illustrate cross-sectional views of a prior art marine shock cell in an extended and retracted condition and a graphical representation of the force versus deflection characteristics of the shock cell.
Figure 2B:
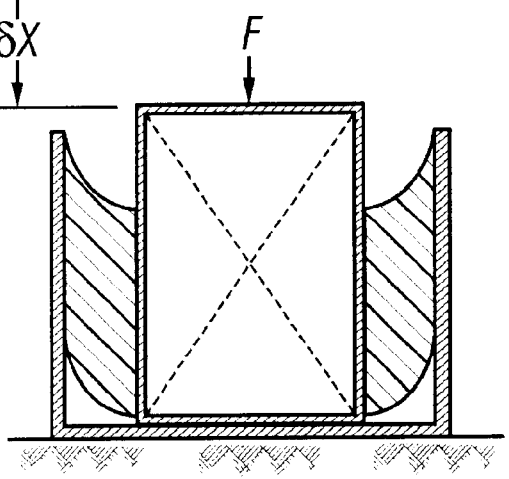
Figure 2C:
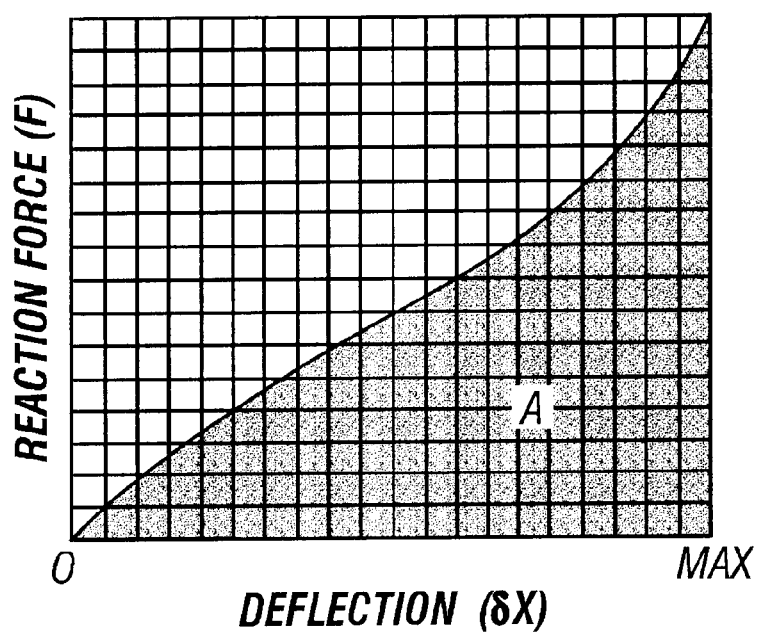

In one embodiment, the elastomer seal construction is similar in fashion to that of an elastomer annulus of a marine shock cell, such as that illustrated previously in FIG. 2. The elastomer seal comprises a vulcanized mixture of natural rubber. The cylinders comprise sections of rolled carbon steel pipes. The elastomer seal is bonded to the cylinders during the molding process consistent with techniques generally known to the marine shock cell industry. Several variations in the geometry and arrangement of the elastomer annulus may be desirable, however, to be adapted for use as an elastomer seal for a expandable cylinder.

Referring now to FIG. 4A, there is shown generalized reaction force versus deflection curves for a shock cell indicated by curve (A). As illustrated the reaction force increases with increasing deflection. The slope of this curve (A) is the stiffness characteristic of the shock cell. The area under the curve represents the quantity of energy required to induce deflection. Where employed as an expandable cylinder, this absorbed energy reduces the quantity of fluid power transmitted by the cylinder. For many applications, efficient power transmission is desirable. This can be achieved by reducing the stiffness characteristic of the expandable cylinder unit 300 to deflection, such as that indicated by curve (B). In a shock cell, the elastomer annulus is designed to provide resistance to deflection. In an expandable cylinder unit 300, an elastomer seal 308 performs the primary functions of containing fluid pressure and maintaining a fluid tight seal. The thickness of the elastomer seal 308 can, therefore, generally be substantially reduced to that required to perform these functions.

As illustrated in FIG. 4B, the elastomer seal thickness need not be uniform. The minimum required thickness at the inner 312 and outer 314 bond surfaces ($T_1$ and $T_2$) is primarily determined based upon the required bond area to withstand the force of fluid pressure (P) upon the elastomer seal. Bond area is a function of cylinder diameter. A larger seal thickness ($T_1 > T_2$) is therefore generally required on the inner bond surface 312 to achieve an equivalent bond area with respect to the outer bond surface 314. A secondary factor in determining elastomer seal thickness is shear stress in the elastomer. In general, shear stress is highest at the bond surfaces 312 and 314. In general, the elastomer seal cross-section is designed to spread shear stress over a large area. Lips and radiuses may therefore be desirable at the edge of the bond surfaces 312 and 314 to further spread out the shear stress. Near the center of the elastomer seal 308, however, the elastomer material may be subject to almost pure tensile stress. Elastomers, such as rubber, generally have significantly better resistance to tensile stress than to shear stress. This may allow the elastomer seal 308 to be designed with a narrower thickness ($T_3$) near the center of its length (L). For lower fluid pressure applications, the thickness ($T_3$) of the elastomer seal 308 can be reduced such that the stiffness of the expandable cylinder unit 300 to elongation is extremely small. Where higher fluid pressures are employed, the required thickness ($T_3$) may be larger. The overall expandable cylinder unit 300 stiffness, however, may be small relative to the magnitude of extension forces transmitted. The exact placement (X) of the narrowed portion ($T_3$) can be varied dependent upon various factors.

As illustrated in FIG. 4C, fluid pressure (P) acting upon the elastomer seal 308 induces a resultant force (F) which, due to the circular cross-section, generally applies nearer the outer edge of the seal 308. Some portion of this resultant force (F) will be applied to the inner cylinder 306 with the remaining applied to the outer cylinder 304. This latter portion of the resultant force (F) applied to the outer cylinder 304 acts to reduce the extension force provided by the expandable cylinder unit 300 for a given fluid pressure (P). For this reason, a designer may wish to adjust the cross-section of the elastomer seal 308 to maximize that portion of the resultant force (F) applied to the inner cylinder 306. For relatively thick seal configurations, the elastomer seal 308 may function in a manner similar to an almost rigid beam for design purposes. Generally, however, an elastomer seal 308 will deform under pressure (P) and permit a designer to adjust the cross-sectional thickness ($T_1$, $T_2$, and $T_3$) to manipulate the application of the resultant force (F).

Additional modifications over conventional shock cell designs may be desirable. The elastomer mixture may be varied to reduce stiffness and increase power transmission efficiency. A designer may also wish to vary the elastomer mixture in order to improve bonding strength and seal fatigue characteristics. Mixtures of natural rubber may generally be preferred due to natural rubber's elastic properties, resistance to tearing, steel bonding characteristics, and resistance to tensile stress. For certain applications, however, other elastomer mixtures may be preferred. For example, neoprene may be desired where the expandable cylinder unit is employed in the presence of hydrocarbons. For long term use, there may be concern over the absorption of air or fluids into the elastomer. One means for preventing absorption is to have a thin additional layer of absorption resistant material bonded or otherwise applied to the seal surfaces exposed to air or fluids. A designer may also desire to machine the cylinder surfaces to which the elastomer seal is bonded. The machining might be smooth or grooved to improve bond performance. The cylinder surfaces may be prepared in other ways prior to bonding, such as cleaning with acid or other treatments, to further ensure bond quality.

Figures 5A, 5B:
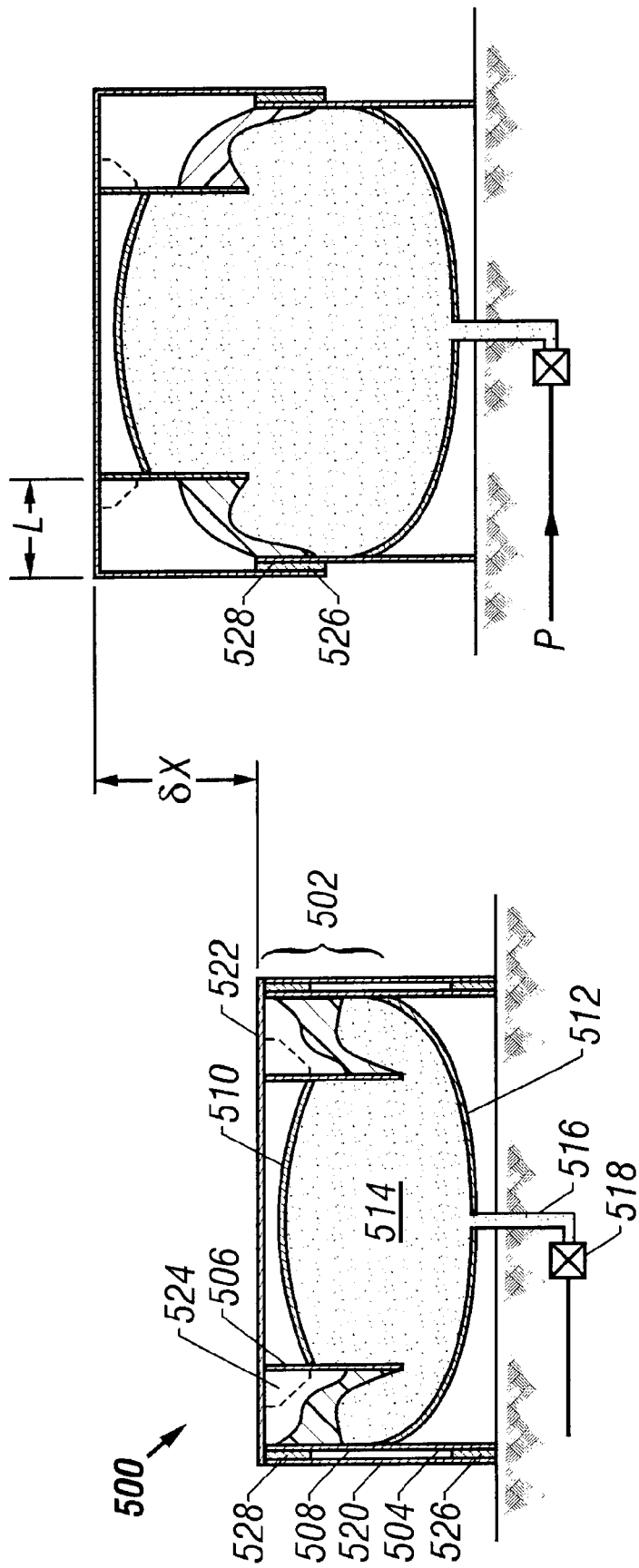
FIGS. 5A–B illustrate a cross-sectional and top view of an expandable cylinder unit having a downward angled elastomer seal in a retracted and extended position.

In addition to variations in the thickness of the elastomer seal cross-section, a designer may wish to mold the seal in an offset condition. In one embodiment, illustrated in FIG. 5A, an expandable cylinder unit 500 has an offset elastomer seal configuration. The expandable cylinder unit 500 comprises a single expansion segment 502. The expansion segment further comprises an outer 504 and inner 506 cylinder. An elastomer seal 508 is bonded and molded to the cylinders 504 and 506 with an offset. The outer bond surface is molded offset a distance above the inner bond surface. A top end cap 510 and bottom end cap 512 enclose the fluid cavity 514. A fluid line 516 through the bottom end cap 512 provides a means of fluid flow to and from the fluid cavity 514. The fluid line 516 is connected through a valve 518 to a source of fluid power (not shown). The expansion joint 502 is disposed within an external sleeve 520 having an end plate 522 and stiffeners 524 connecting the sleeve 520 to the inner cylinder 506. A first stopper ring 526 is attached to the inside of the bottom end the sleeve 520. A second stopper ring 528 is attached to on the outside of the top end of the outer cylinder 504. When pressurized fluid (P) is injected into the fluid cavity 514, the expandable cylinder unit 500 will elongate from the retracted position, shown in FIG. 5A, to the extended position, shown in FIG. 5B. The first stopper ring 526 and second stopper ring 528 are arranged so as to limit the maximum extent of expandable cylinder extension ($\delta X$). The offset elastomer seal configuration may be designed so as to defer the higher elastomer tensile stress at the bond surfaces to a point of further deflection. This configuration may allow a designer to permit the deflection of an expansion joint to be elongated (e.g., $\delta X > L$) over a non-offset seal configuration such as that shown in FIG. 3A. The offset seal configuration also has the characteristic of returning to the fully retracted position, shown in FIG. 5A, when fluid power is removed. As illustrated, only one expansion joint 502 is employed. It should be clear, however, that a large number of expansion joints may be employed in parallel to increase the maximum deflection.

Figures 6A, 6B:
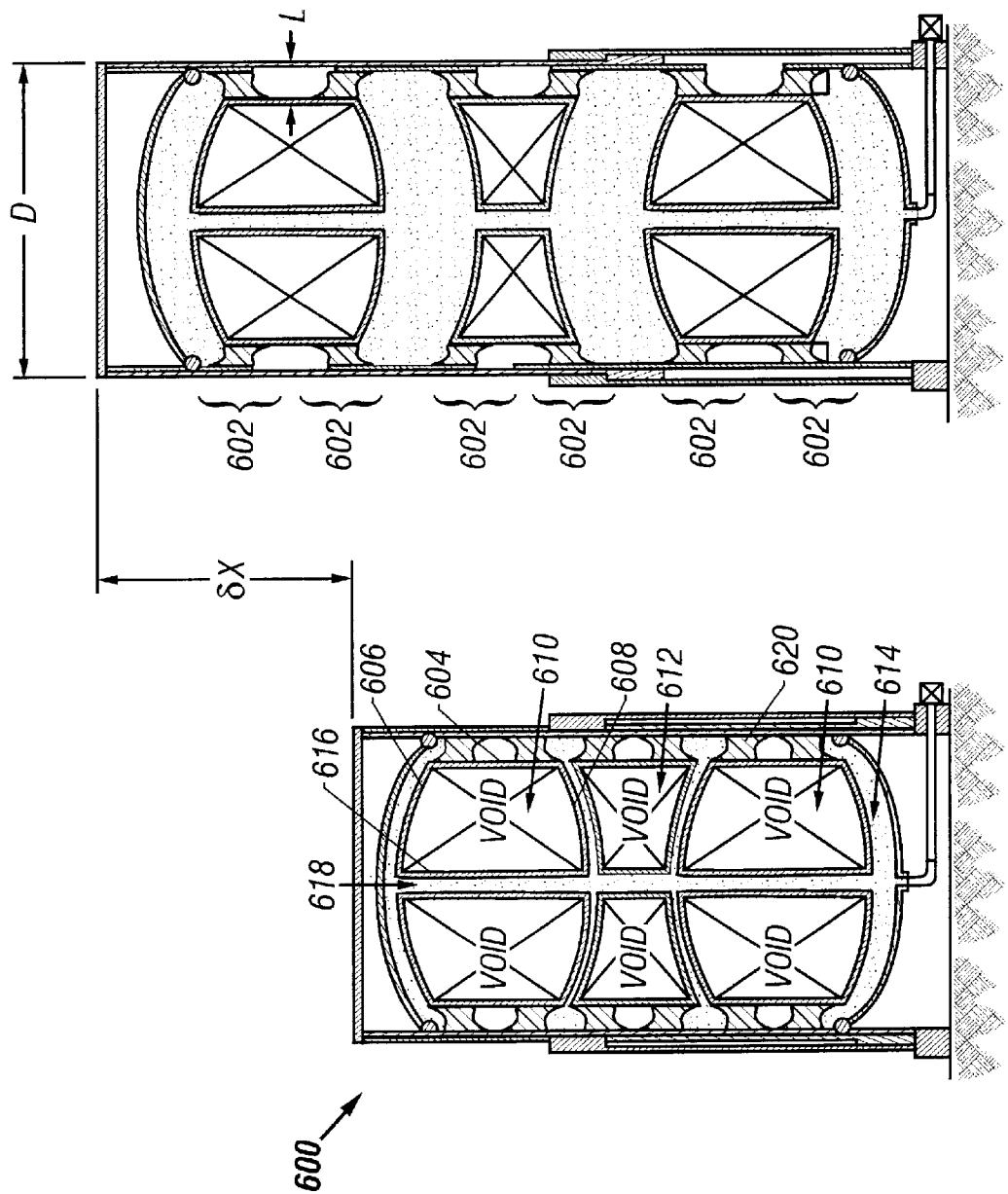
FIGS. 6A–B illustrate a cross-section view of an expandable cylinder unit having blanks inserted to reduce fluid volume in a retracted and extended condition.

In one embodiment, illustrated in FIGS. 6A–B, an expandable cylinder unit 600 employs multiple expansion segments 602 in a configuration having a large diameter (D) in comparison to the seal gap length (L). Hydraulic fluids, including seawater, are heavy. In order to reduce the weight of an expandable container unit, some areas of the cavities within the container unit can be voided. In one embodiment, the expandable unit 600 comprises inner cylinders 604 plated on top 606 and bottom 608 to form void convex 610 and concave 612 cavities or blanks. Fluid in the fluid cavity 614 is transmitted through the blanks 610 and 612 by means of fluid passages 616. In one embodiment, the fluid passages 616 are pipes which connects apertures 618 in the top 606 and the bottom 608 plates. As illustrated in FIG. 6A, the blanks 610 and 612 greatly reduce the volume of fluid in the cavity 614 when the expandable container unit is in the fully retracted position. In other words, the blanks 610 and 612 are arranged so as to almost completely evacuate the expandable container unit in the fully retracted position, shown in FIG. 6A, by filling areas of unnecessary fluid volume. Such a configuration also provides greater contact area and stability in the retracted position. Care should be taken, however, to ensure that the elastomer seals 620, blanks 610 and 612, and plates 606 and 608 do not form a vacuum in the retracted position which can impede extension ($\delta X$) of the expandable container unit to the extended position, shown in FIG. 6B.

Figure 7:
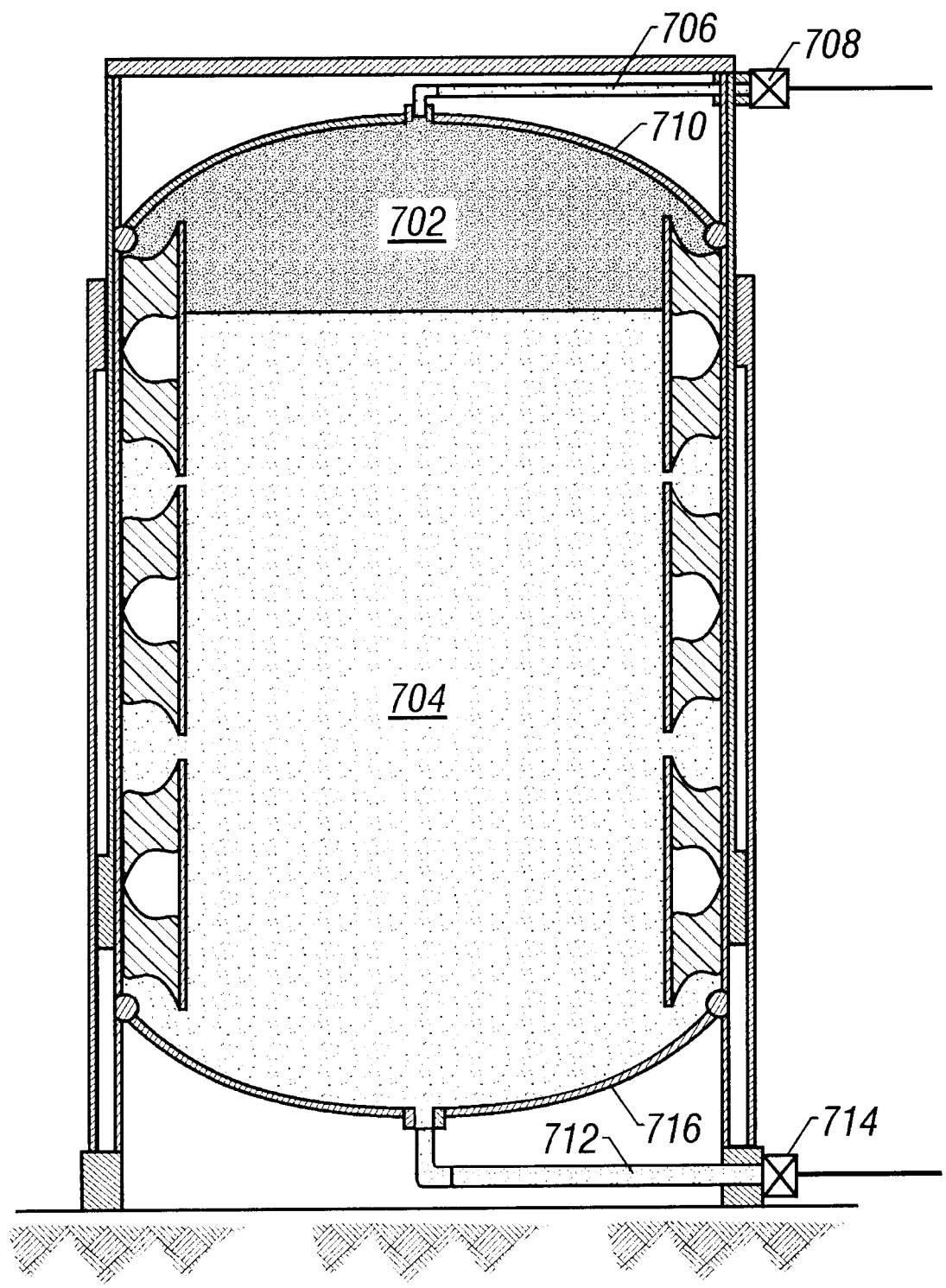
FIG. 7 illustrates a cross-section view of an expandable cylinder unit employing a mixed transmission medium of gas and fluid.

In certain applications, shock loads or oscillator motions may be encountered during expandable cylinder operation. Some amount of shock load or oscillation will be absorbed by the bulging of the elastomer seals. Where shock loads or motions are expected, a designer may wish to add additional capacity to compensate for such service condition. In one embodiment, illustrated in FIG. 7, an expandable cylinder unit 700 employs a mixed medium of air 702 and water 704 as fluid power transmission fluids. An upper fluid line 706 having a valve 708 extends through a top end cap 710 to provide a means of controlling the volume and pressure of air 702 in the expandable cylinder unit 700. A lower fluid line 712 having a valve 714 extends through a bottom end cap 716 to provide a means of controlling the volume of water 704 in the expandable cylinder unit 700. The quantity of water 704 is controlled to determine the mean cylinder extension in a load independent manner. The air volume permits some amount of load dependent deflection, providing a spring force to oppose and balance varying external loads. As deflection from shock loads or oscillator motions occurs, the air volume changes increasing or decreasing the air and water pressure to provide the spring force. The quantity of air 702 may be fixed during cylinder extension, with extension provided by injecting water, or quantity of both air 702 and water 704 may be varied. For some applications, however, it may be desirable to use air 702 injection alone as the means of inducing cylinder extension.

Figure 8:
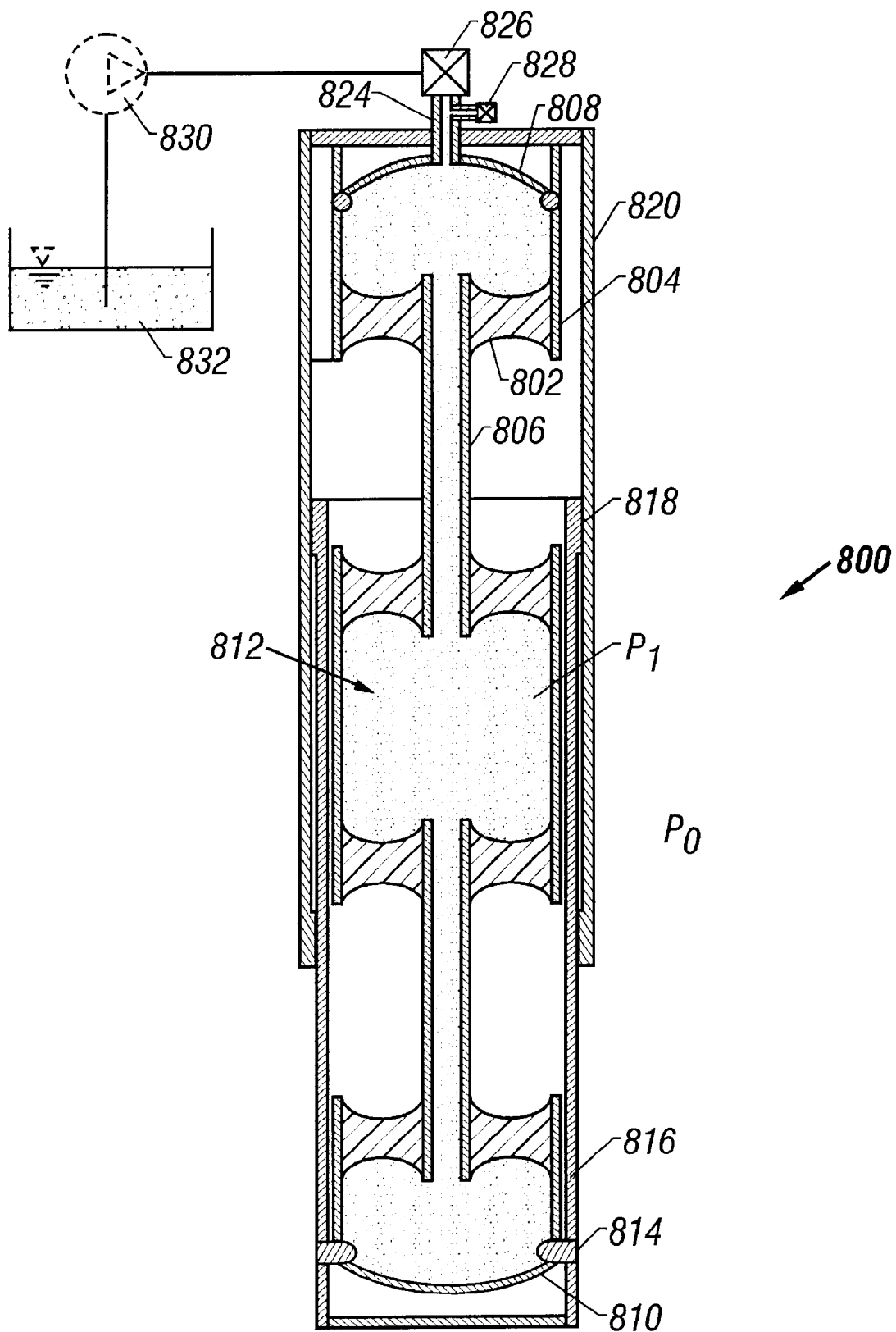
FIG. 8 illustrates a cross-sectional view of the expandable cylinder unit having a double action configuration adapted for subsea applications.

In certain application, it may be desirable to have an expandable cylinder that provides both extension and retraction forces. In one embodiment, illustrated in FIG. 8, an expandable cylinder unit 800 is designed for under water utilization to provide extension and retraction forces. Elastomer seals 802 are bonded to outer cylinder 804 and inner cylinder 806 without offset. Top end cap 808 and bottom end cap 810 enclose the fluid cavity 812. A load ring 814 connects the bottom cap 810 to an inner sleeve 816 having a first stopper ring 818. The upper end cap 808 is connected to an outer sleeve 820 having a second stopper ring 822. A fluid pipe 824 having a inlet valve 826 passes through the top end cap 808. An equalization valve 828 is connected to the fluid pipe 824. In operation, the equalization valve 828 is opened during submergence of the expandable cylinder unit 800 to equalize external water pressure ($P_0$) with internal water pressure ($P_1$). Thereafter, the equalization valve may be closed to permit actuation of the cylinder by a pump assembly 830 drawing or returning water to a fluid reservoir 832. In one embodiment, fluid is drawn directly from the surrounding water in order to dispense with the need for an external fluid source. As illustrated by reference to FIG. 9A, removal of water from the expandable cylinder unit 800 will induce cylinder retraction ($\delta X_1$). The magnitude of the retraction force ($F_1$) is determined by the difference between the external ($P_0$) and internal ($P_1$) water pressures, where ($P_0 > P_1$). It should be noted that the magnitude is limited by an minimum internal pressure of 0 psi, at which point a vacuum is formed. The magnitude of the potential maximum retraction force therefore increases with water depth, as external water pressure ($P_0$) increases with depth. As illustrated by reference to FIG. 9B, injection of water will induce cylinder extension ($\delta X_2$). The magnitude of the extension force ($F_2$) is determined by the difference between the external ($P_0$) and internal ($P_2$) water pressures, where ($P_2 > P_0$). The magnitude of the extension force ($F_2$), however, functions independently of water depth due to the ability to equalize internal and external fluid pressures prior to operation. The magnitude of the extension force ($F_2$) also has no absolute limit.

It should be noted that stiffness of the elastomer seals to cylinder extension will generally induce either extension force variation or variation in the internal fluid pressure. Conventional pumps provide fluid flow by inducing head or differential fluid pressure without strict control of the fluid volume pumped. It may therefore be desirable to employ a volume controlled, rather than a pressure controlled, pumping mechanism. In one embodiment, the pump assembly 830 comprises a positive displacement type pumping device. Positive displacement pumps function to pump discrete quantities of fluid to provide precise volumetric control. There are several major categories of positive displacement pumps: piston, rotary, and screw. Piston positive displacement pumps employ pistons to draw a volume of fluid from one source during up stroke and displace that volume to another source on the down stroke. Rotary positive displacement pumps employ chambered disks in which rotating chambers move volumes of water between chambers. Screw positive displacement pumps employ a chambered screw mechanism to perform the same function. While having a maximum design fluid pressure, positive displacement pumps can provide a precision cylinder extension based upon fluid volume control rather than fluid pressure.

In certain applications, the amount of cylinder extension as a function of retracted unit height may be of importance to a designer. In one embodiment, illustrated in FIGS. 10A–B an expandable container unit 1000 has a staggered arrangement of two tiers of overlapping expansion segments 1002 and 1004. There is an outer cylinder 1006 having an elliptical end cap 1008, and a first inner cylinder 1010 of smaller diameter disposed within the outer cylinder 1006. The gap between the outer cylinder 1006 and the first inner cylinder 1010 is spanned and sealed by a first elastomer seal 1012. A second inner cylinder 1014 of still smaller diameter is disposed within the first inner cylinder 1010. The gap between the first inner 1010 and second inner 1014 cylinder is spanned and sealed by a second elastomer seal 1016 enclosing the fluid cavity 1018. A fluid pipe 1020 having a valve 1022 passes through the end cap 1008. In the fully retracted position, as illustrated in FIG. 10A, the first inner cylinder 1004 and second inner cylinder 1014 are nested within the outer cylinder 1006. The total height (H) of the unit in a fully retracted position may be as low as approximately four times the seal span length (L). As illustrated in FIG. 10B, the total cylinder extension ($\delta X$), however, may be as long as eight times the span length (L), where a 1:1 span length versus deflection ratio is used.

Figure 11:
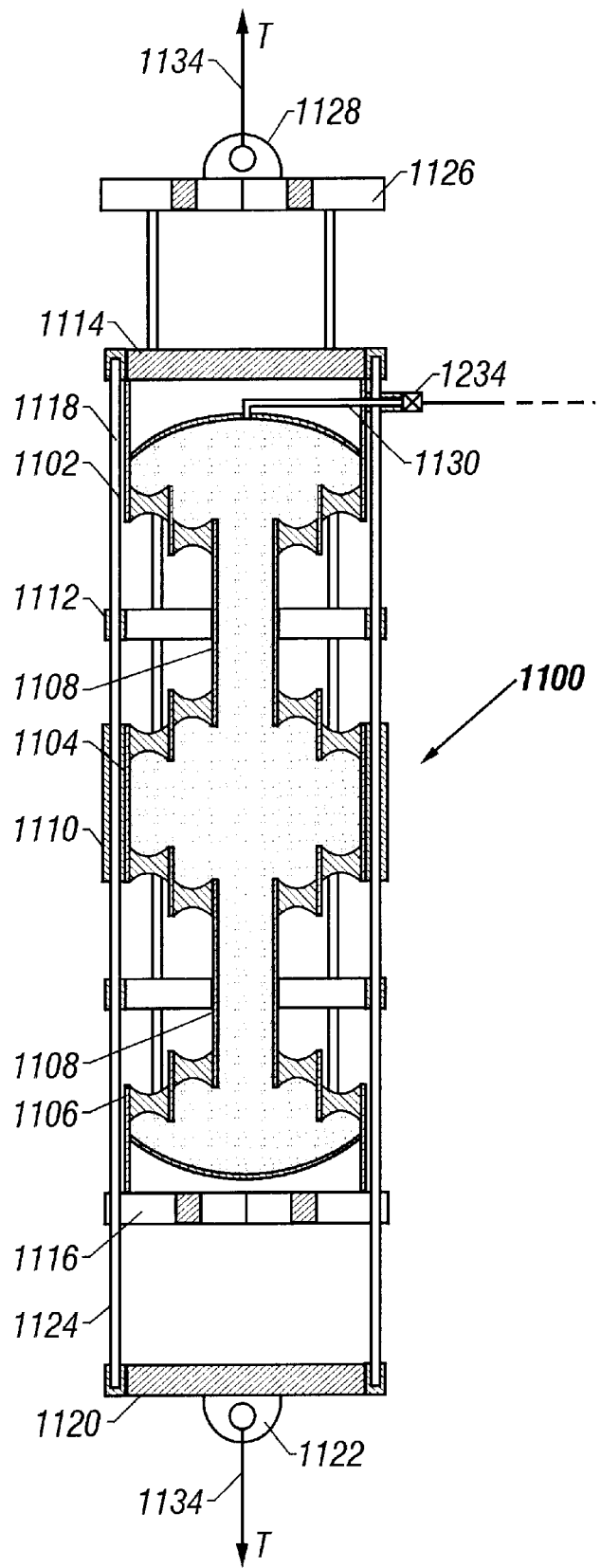
FIG. 11 illustrates a cross-sectional view of an expandable cylinder unit configured to provide a tension force.

In certain applications, it may be desirable to configure an expandable cylinder unit to provide a tension force. In one embodiment, as illustrated in FIG. 11A, an expandable unit 1100 is disposed between opposing load blocks to convert cylinder extension force into tension (T). In one embodiment, multiple expansion segments are employed in a symmetric arrangement of nested tiers. The expandable container unit 1100 comprises a top outer cylinder 1102, a middle outer cylinder 1104, a bottom outer cylinder 1106, and two inner cylinders 1108. The middle outer cylinder 1104 has first guide sleeves 1110. The inner cylinders 1108 are elongated and have second guide sleeves 1112. The top outer cylinder 1102 changes a top load block 1114. The bottom outer cylinder engages a bottom load block 1116. A first system of extension rods 1118 extend from the top load block 1114 down through the guide sleeves 1110 and 1112 to a bottom end plate 1120 having a padeye 1122. A second system of extension rods 1124 extend from the bottom load block up through guide sleeves (not shown) to a top end 1126 having a second padeye 1128. The second system of extension rods 1124 is rotated some offset angle from the first 1118 to avoid interference. In one embodiment fluid is injected into the expandable container unit through a flow line 1130 having a valve 1132. The extension force of the cylinder presses against the opposing load blocks 1114 and 1116 to produce a tension force in the first and second system of extension rods 1118 and 1120. The extension force is transmitted to the padeyes 1122 and 1128 to produce tension (T) in slings 1134.

In certain applications, it may be desirable to dispose an expandable cylinder unit about a second body such as a tubular member. In one embodiment, illustrated in FIGS. 12A–C, an expandable cylinder unit 1200 forms a sleeve around a tubular member 1202. The expandable cylinder unit 1200 comprises four expansion segments 1204 each comprising a first outer cylinder 1206 and a second outer cylinder 1208 of smaller diameter, a first inner cylinder 1210 and a second inner cylinder 1212 of smaller diameter. An outer elastomer seal 1214 is bonded between the first 1206 and second 1208 outer cylinders. An inner elastomer seal 1216 is bonded between the first 1210 and second 1212 inner cylinders. Top 1218 and bottom 1220 end caps enclose the cylindrical shaped fluid cavity 1222. A fluid line 1224 having a valve 1226 passes through the top end cap 1218 to provide a means of fluid flow to and from the cavity 1222. A first load ring 1228 connects the bottom end cap 1220 to an inner sleeve 1230 having a first stopper ring 1232. The upper end cap 1218 is connected to an outer sleeve 1234 having a second stopper ring 1236. Extension force is applied to the tubular member 1202 through a second load ring 1238 connected at a top end 1240 of the expandable cylinder unit 1200. Extension and retraction of the unit induce relative displacements (δX) between the tubular member 1202 and bottom end 1242 of the expandable cylinder unit 1200.

While the invention has been described with respect to a limited number of embodiments, those skilled in the art will appreciate the numerous variations therefrom without departing from the spirit and scope of the invention.

What is claimed is:

1. A load bearing device comprising:
    an extendable, close-ended container having multiple sets of first cylinders, second cylinders, and first elastomer annuli,
        the first cylinders coaxially disposed about the second cylinders and having diameters larger than the diameters of the second cylinders;
        the first elastomer annuli disposed between the first cylinders and the second cylinders, each first elastomer annulus having an outer circumference bonded to an inner surface of one of the first cylinders and an inner circumference bonded to an outer surface of one of the second cylinders; and
    first means for pumping a first fluid into and out of the container;
    wherein the bonds between the elastomer annuli and the first and second cylinders form a fluid-tight seal for the container.

2. The device of claim 1, wherein each of the elastomer annuli has a uniform cross-sectional profile.

3. The device of claim 1, wherein a cross-sectional profile of each of the elastomer annuli is thinner near a center of the annulus than near the outer and inner circumferences.

4. The device of claim 1, wherein a cross-sectional profile of each of the elastomer annuli is thicker near the inner circumference than near the outer circumference.

5. The device of claim 1, wherein the inner circumference of each of the elastomer annuli is offset in relation to the outer circumference.

6. The device of claim 1, wherein the first fluid comprises water.

7. The device of claim 1, wherein each of the elastomer annuli forms a non-sliding seal with the first and second cylinders.

8. The device of claim 1, further comprising a blank disposed within at least one of the second cylinders so as to reduce the volume of the second cylinder.

9. The device of claim 1, further comprising means for equalizing a pressure inside and outside of the container.

10. The device of claim 1, further comprising a first sleeve and a second sleeve disposed about the container, the second sleeve having a diameter which is larger than a diameter of the first sleeve.

11. The device of claim 10, further comprising a first stop attached to the first sleeve and a second stop attached to the second sleeve so as to limit a maximum extension of the container.

12. The device of claim 1, further comprising a third cylinder disposed coaxially with one of the second cylinders and having a diameter which is smaller than the diameter of the second cylinder; and
    a second elastomer annulus having an outer circumference bonded to an inner surface of the second cylinder and an inner circumference bonded to an outer surface of the third cylinder.

13. The device of claim 1, further comprising a third cylinder coaxially disposed within one of the second cylinders and having a diameter which is smaller than a diameter of the second cylinder;
    a fourth cylinder coaxially disposed within the third cylinder and having a diameter which is smaller than the third cylinder; and
    a second elastomer annulus having an outer circumference bonded to the inner surface of the third cylinder and an inner circumference bonded to the outer surface of the fourth cylinder.

14. A load bearing device comprising:
    an extendable, close-ended container having a first cylinder and a second cylinder, the first cylinder coaxially disposed about the second cylinder and having a diameter which is larger than a diameter of the second cylinder;
    a first elastomer annulus having an outer circumference bonded to an inner surface of the first cylinder and an inner circumference bonded to an outer surface of the second cylinder, wherein the bonds between the elastomer annulus and the first and second cylinders form a fluid-tight seal for the container;
    first means for pumping a first fluid into and out of the container; and
    second means for pumping a second fluid into and out of the container.

15. The device of claim 14, wherein the first fluid comprises water and the second fluid comprises air.

16. A method of bearing a load comprising:

providing an extendable, close-ended container having a first cylinder and a second cylinder, the first cylinder coaxially disposed about the second cylinder and having a diameter which is larger than a diameter of the second cylinder, the first and second cylinder connected together by an elastomer annulus so as to form a fluid-tight seal between the elastomer annulus and the first and second cylinders;

inducing relative movement between the first and second cylinder by adjusting a volume of fluid within the container;

submerging the container; and equalizing the fluid pressure within the container and an external hydrostatic pressure.

17. The method of claim 16, further comprising extending the extendable container by pumping a fluid into the container.

18. The method of claim 16, further comprising retracting the extendable container by removing a fluid out of the container.

19. The method of claim 16, further comprising adding an additional set of first and second cylinders to increase an extendable length of the extendable container.

* * * * *

UNITED STATES PATENT AND TRADEMARK OFFICE
CERTIFICATE OF CORRECTION

PATENT NO.    : 6,427,577 B1
DATED         : August 6, 2002
INVENTOR(S)   : James J. Lee et al.

It is certified that error appears in the above-identified patent and that said Letters Patent is hereby corrected as shown below:

<u>Title page,</u>
Item [73], the following should read as:
-- Novellent Technologies, L.L.C. Houston, TX --

Signed and Sealed this

Eighth Day of April, 2003

JAMES E. ROGAN
*Director of the United States Patent and Trademark Office*